Figure 1:
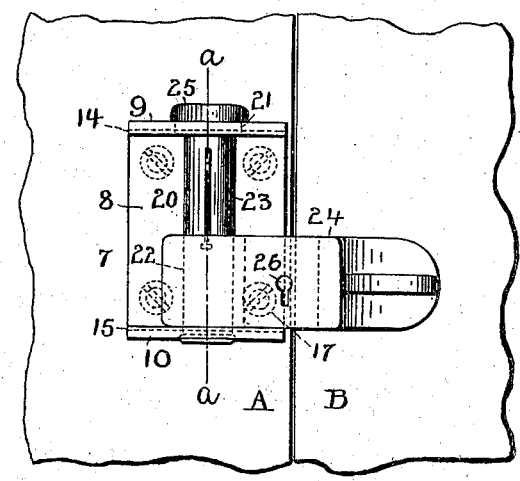

No. 709,056. Patented Sept. 16, 1902.
G. G. SMITH.
LOCK.
(Application filed Nov. 26, 1901.)

(No Model.)

Witnesses:
Frederick G. Hachenberg.
R. W. Pittman.

Inventor.
George G. Smith.
By his Attorney.
F. A. Richards.

UNITED STATES PATENT OFFICE.

GEORGE GREGORY SMITH, OF FLORENCE, ITALY.

LOCK.

SPECIFICATION forming part of Letters Patent No. 709,056, dated September 16, 1902.

Application filed November 26, 1901. Serial No. 83,704. (No model.)

*To all whom it may concern:*

Be it known that I, GEORGE GREGORY SMITH, a citizen of the United States, residing in Villa Bel Riposo, San Domenico, Florence, Italy, have invented certain new and useful Improvements in Locks, of which the following is a specification.

This invention relates to locks or bolts, and has for its object to provide an improved and efficient lock for use upon doors, windows, &c.

Another object of the invention is to provide a lock which may be secured upon the outside of the place which it is desired to lock and in which the locking of the bolt will also control the means used to secure the lock in place.

In carrying out my invention I employ a bolt which is so constructed that it may be mounted upon a pin, one portion of which pin will be made to afford a pivot for the bolt and another portion of the pin will be made of some shape other than round, to which shape the pivotal part of the bolt will conform, so that the bolt when resting upon the part of the pin which is dissimilar in form to the pivot or the pivotless portion it will remain in whatever position it is placed upon such portion of the pin and when moved upon the pivot portion will be free to turn. To enable the lock to be applied to the outside of doors and similar positions where it is impracticable to secure the same in place by securing means which are exposed to the outside, I provide a plate which will overlie a portion of the screws and which will have some securing means which will be overlaid by the bolt when in its locked position. The screw-locking plate may be made to slide in ways in the frame of the lock and to be substantially flat upon the base-plate of the lock. If flat-head screws are employed, the screw-holes may be properly countersunk. If it is desired to use other forms of screws, the position for the plate will be so positioned that it will pass over the heads of the screws or nails or whatever fastening means is employed. If flat-head screws are used, the plate will be countersunk, and if a thin plate is employed part of the countersinking may be in such plate and part of it in the base-plate of the lock, such construction permitting the same kind of screws to be used for fastening the lock upon the structure with which it is to be used and fastening the locking-plate. The screw for holding the screw-locking plate in position might enter the base-plate and not pass through into the structure to which the lock is applied. Such structure, however, would require the use of two different kinds of screws.

The lock may readily be used for a sash-fastener, in which organization instead of locking the bolt in place a suitable spring-catch after the analogy of those used upon umbrellas may be applied upon a portion of the pin for holding the bolt upon the pivotless portion.

Figure 6:
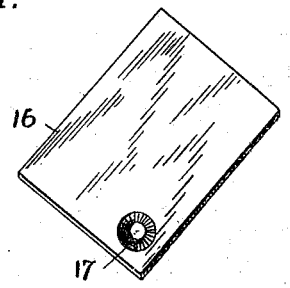
Figure 2:
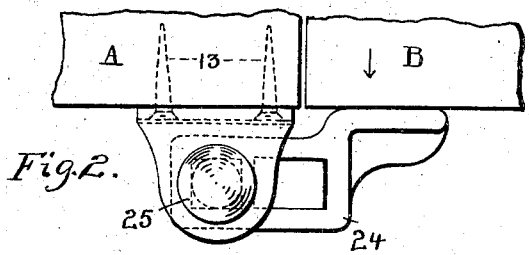
Figure 4:
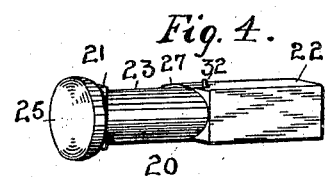
Figure 3:
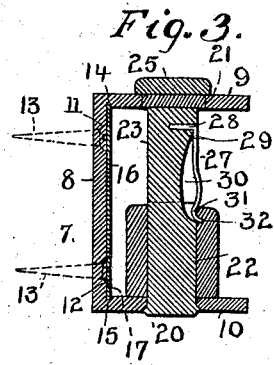
Figure 5:
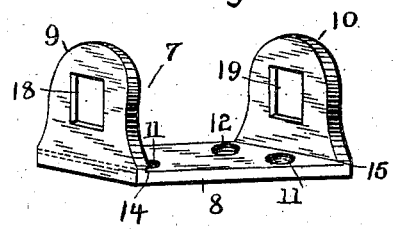

In the drawings accompanying and forming a part of the specification, Figure 1 is a front elevation of a form of my improved bolt applied to a door. Fig. 2 is a top view thereof. Fig. 3 is a central vertical section on the line *a a*, Fig. 1. Fig. 4 is a form of pivot detached. Fig. 5 shows a framework for the lock. Fig. 6 is a detached plate.

The abutting edges of the structure which it is desired to secure by a lock are designated in a general way A B, respectively, to one of which, A, is attached my improved lock, shown as comprising a framework 7, constituting a base-plate 8 and end portions 9 10, respectively. The base-plate is shown as provided with countersunk screw-holes 11, one of which holes 12 is shown as being countersunk a less distance than the others. Through the screw-holes suitable screws or nails 13 may be driven into the structure which it is desired to apply the lock to. The end members 9 and 10 are undercut on the inner side, forming ways 14 15, to receive a plate 16, which is capable of sliding in the ways and covering the heads of all the screws 13 but one, and which plate is provided with a countersunk opening 17, capable of registry with one of the screw-holes 12 and which may, if desired, in conjunction with the countersink of the screw-hole 12, form a seat for the head of a screw similar to the screws used in the other screw-holes, the organization being such that the plate will slide in the undercut ways after all the screws but one have been placed in position; and after the plate has been inserted and the screw passed through its screw-hole and the screw-hole in the plate such screw will control or with the plate lock the other screws in place.

The end portions 9 and 10 are shown provided with squared openings 18 and 19, respectively, through which a suitable pin 20, having correspondingly-squared ends 21 and 22 and a round pivot portion 23, may be inserted, one of the squared ends 22 occupying substantially half of the portion of the pin between the ends 9 and 10. Upon the pin 20 is mounted a suitable bolt 24, having a squared opening corresponding to the squared portion 22 of the pin. The pin may have a head 25 at one end and be upset or riveted at the other end to secure it in the framework. The round portion 23 of the pin forms a pivot for the bolt, the side of the squared ends being equal to the diameter of the pivot. The squared portion forms means for securely holding the bolt either in a locked or open position. If it is desired to unbolt the door when the device is in the position shown in Fig. 1, it is simply necessary to raise the bolt and swing it to one side, when it may be permitted to fall down upon the squared portion and there remain. A suitable lock may be provided, a keyhole 26 being shown, for locking the bolt upon the squared portion. If it is desired to use the bolt upon window-sashes, the pin may be provided with a suitable spring-catch 27, entered by a bent end 28 in a hole 29 in the pivot and lying in a groove 30, which spring and groove extend into the squared portion of the pin and into the squared portion of the bolt. An upturned end 31 of the spring engages a depression 32 in such bolt. The spring is effective to hold the bolt upon the portion of the pin which locks it in such a manner that no instrument inserted from the outside can release the catch and slide the bolt off of its seat; but when it is desired to operate the bolt from the inside it is simply necessary to press down the catch with the finger and slide the bolt. The detent-spring is also effective to hold the bolt upon the pivot portion, and, if the device is used in connection with window-sashes, to hold the bolt upraised after it has been so raised to permit the opening of the window. The screw which enters the plate will lie under the bolt when in its locked position. By this means the plate will cover all the screws but one, and the bolt will lock that screw against removal. Thus when the bolt is locked into position all of the screws will be locked against removal. This feature is important for permitting the lock to be used in positions where it is impracticable to secure the screws or bolts upon the inside and where it is desirable to use the lock upon the outside.

Although the device is shown with a round pivot and a square retaining portion, yet it will be obvious that any shapes on which the bolt may turn and be held in place may be employed, and although the screws are shown as entered in countersinks and the securing-plate substantially flat on the base-plate of the frame many modifications may be made which will suggest themselves to the workman as the exigencies of manufacture may require.

Having described my invention, I claim—

1. A lock comprising a base-plate; a pin embodying a pivot and a locking-seat carried thereby; a bolt capable of turning on the pivot and of locking on the seat; holes through the base-plate capable of receiving screws; a plate effective to overlie a portion of the holes and screws therein; a hole in the plate capable of receiving a screw; a bolt carried by the base-plate, and capable of overlying the screw traversing the plate; the organization being such that the plate locks the screws which it overlies, and the bolt locks the screw which holds the plate.

2. In a lock the combination with a base-plate, of a bolt pivoted thereon and capable of being locked in its closed position; means effective to hold the base-plate in position; an independent member for closing access to the holding means; and means covered by the bolt, in its closed position, for holding said access-closing member in place.

3. In a lock, the combination of a frame having a base-plate provided with countersunk screw-holes, one of which is countersunk to less depth than the others; and a plate effective to overlie the screw-holes, and having a countersink registering with the screw-hole of the least countersink, and together capable of receiving the same-sized screw that the other holes are capable of receiving.

4. In a lock effective to be secured by screws, means for locking all the screws but one in place; a screw for securing the locking means in place; and a bolt effective to control the securing-screw.

5. The combination of a base-plate; end members thereon; undercut ways in the end members; squared holes in the end members; a pin, having a head, squared ends, and a pivot portion secured in the squared holes; a bolt, having a squared pivot-hole, on the pin; screw-holes in the base-plate; a plate capable of sliding in the ways; and a screw-hole in the plate capable of registering with a screw-hole in the base-plate and of receiving a screw.

6. The combination of a base-plate; end members thereon; undercut ways in the end members; squared holes in the end members; a pin, having a head, squared ends, and a pivot portion secured in the squared holes; a bolt, having a squared pivot-hole, on the pin; screw-holes in the base-plate; one of which screw-holes occupies a position under the bolt when closed; a plate capable of sliding in the ways; a screw-hole in the plate capable of registering with the bolt-covered screw-hole in the base-plate and of receiving a screw; and means for locking the bolt.

7. The combination of a bolt; means capable of supporting the bolt in two different planes, and to afford a pivot therefor when in one of the planes; and a spring-detent effective to hold the bolt away from the pivot portion.

8. The combination of a bolt; means capable of supporting the bolt in two different planes, and to afford a pivot therefor when in one of the planes; and a spring-detent effective to hold the bolt on either portion.

9. The combination of a bolt; means capable of supporting the bolt in two different planes, and to afford a pivot therefor when in one of the planes; and a spring-detent effective to hold the bolt when on the pivot portion in any position it may be placed.

10. The combination of a pin affording a pivot and pivotless seat for a bolt; a bolt thereon; a groove in the pin; a spring secured in the groove and capable of engaging the bolt.

11. The combination of a pin affording a pivot and a pivotless seat for a bolt; a bolt thereon; a depression in the bolt; a groove in the pin; a spring secured in the groove and having an upturned end and capable of engaging the depression in the bolt.

12. The combination of a base-plate; end members thereon; undercut ways in the end members; squared holes in the end members; a pin, having a head, squared ends, and a pivot portion, secured in the squared holes; a bolt, having a squared pivot-hole, on the pin; screw-holes in the base-plate; a plate capable of sliding in the ways; a screw-hole in the plate capable of registering with screw-holes in the base-plate and of receiving a screw; a groove in the pin; and a spring in the groove effective to hold the bolt off the pivot portion of the pin.

13. The combination of a base-plate; end members thereon; undercut ways in the end members; squared holes in the end members; a pin, having a head, squared ends, and a pivot portion, secured in the squared holes; a bolt, having a squared pivot-hole, on the pin; screw-holes in the base-plate; one of which screw-holes occupies a position under the bolt when closed; a plate capable of sliding in the ways; a screw-hole in the plate capable of registering with the bolt-covered screw-hole in the base-plate and of receiving a screw and means for locking the bolt, a groove in the pin, and a spring in the groove effective to hold the bolt off the pivot portion of the pin.

GEORGE GREGORY SMITH.

Witnesses:
CHAS. LYON RUSSELL,
R. W. PITTMAN.